3,379,723
CATIONIC SCARLET DYE FOR ACID-
MODIFIED FIBERS
Ray Allen Clarke, Pitman, N.J., assignor to E. I. du Pont de Nemours and Company, Wilmington, Del., a corporation of Delaware
No Drawing. Filed Oct. 25, 1966, Ser. No. 589,197
1 Claim. (Cl. 260—240.9)

ABSTRACT OF THE DISCLOSURE

A cationic methine dye which dyes acid-modified acrylic fiber a bright reddish orange shade and acid-modified polyester fiber a brilliant scarlet shade.

BACKGROUND OF THE INVENTION

The new dye of this invention will significantly expand the shade range of brilliant red dyes since it is considerably yellower than C.I. Basic Red 14 with about the same lightfastness and thus permits dyers to obtain brilliant scarlet shades not previously possible with existing commercial dyes. This dye will also be a particular interest for the printing of the "sixty" series "Dacron" polyester fiber to yield a highly desired bright scarlet shade similar to that of C.I. Basic Red 14 on acid-modified acrylic fiber.

As is well known to those knowledgeable in the art of dyeing and printing acid-modified synthetic fibers, brightness or brilliance of shade is a highly desirable commercial goal. This need has been well satisfied on acid-modified acrylic fibers by, for example, C.I. Basic Red 14. However, when previously known dyes, noted for their brightness on acid-modified "Orlon" acrylic fibers, are applied to acid-modified "Dacron" polyester fibers, these previously known dyes lose much of their brightness since the brilliant red shade shifts to a bluer-red. The printing trade, in particular, has long sought a dye for acid-modified "Dacron" polyester fiber which would yield a shade comparable to that obtained with C.I. Basic Red 14 on "Orlon" acrylic fiber. The dye of this invention has significant lightness and will fulfill this need.

DESCRIPTION OF THE INVENTION

Like other dyes of similar structure, the brilliant red dye of this invention also becomes bluer when applied to acid-modified "Dacron" polyester fiber, as compared to acid-modified "Orlon" acrylic fiber. However, since this dye gives a particularly yellowish-red, brilliant shade, on acid-modified "Dacron" polyester fiber a true brilliant red shade is obtained.

Other uses for this unique, brilliant red shade will become apparent to one skilled in the art. For example, it will have utility on acid-modified acrylic carpet fibers; it can be added to other, duller-red, cationic dyes for the purpose of obtaining brighter shades; it can be used in combination with another dye to make a very attractive cationic navy mix; furthermore, addition of a yellow component to the navy mix will afford a good cationic black mix.

It is an object of the present invention to provide a novel and unobvious cationic scarlet methine dye having significant utility for the dyeing of the acid-modified fibers. It is a further object of this invention to provide such a novel dye which may be utilized in the dyeing of polyacrylonitrile fibers in which fibers a flame retardant has been incorporated during the spinning step. A still further object is to provide such a novel dye which possesses significantly better lightfastness properties than those of the closest prior art when comparing the dyes singly or as mixtures with other dyes.

These and other objects of the invention will become apparent from the following description and claims.

More specifically, this invention is directed to a dye of the formula:

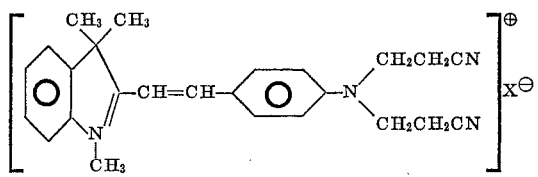

wherein said $X^\ominus$ is an anion selected from the group consisting of $H_2PO_4^\ominus$, phosphomolybdate, acetate, chloride and sulfate.

This invention also encompasses the use of the above dye for dyeing or printing acid-modified polyacrylic fibers and the use of said dye for dyeing or printing acid-modified polyester fibers.

The dye of this invention is prepared by condensing bis-cyanoethylaminobenzaldehyde with Fischer's base in isopropyl alcohol solution using phosphoric acid as the catalyst. This process is disclosed in U.S. Patent 2,734,901.

Representative examples illustrating the present invention follow.

Example 1

To 64 parts of isopropyl alcohol was added 17.3 parts 2-methylene-1,3,3-trimethylindoline (Fischer's base) and 22.7 parts of 4-[bis(2-cyanoethyl)amino]-benzaldehyde. 12.5 parts of 85% phosphoric acid was added dropwise over a one hour period; the reaction mixture was heated to reflux (82–83° C.) for one hour. After cooling the reaction mixture to 20° C., the crystalline product was isolated by filtration and washed with 92% aqueous isopropyl alcohol. The product was vacuum dried at 40° C. to afford an excellent yield (near quantitative) of dye.

The dye corresponds to the structure as follows:

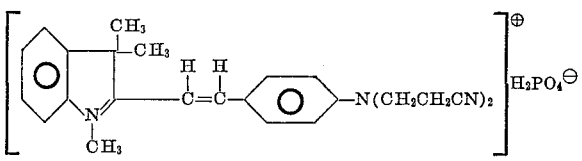

It dyes polyacrylic fibers, such as "Orlon" acrylic fiber, in bright reddish orange shades having good lightfastness. When applied to acid modified polyester fiber, such as "Dacron" type 62 polyester fiber, in aqueous dyeing or printing applications, a brilliant scarlet shade is obtained. This shade has been particularly desired by dyers and printers of polyester fibers and has not hitherto been possible with existing commercial dyes or mixtures of them. Thus this dye fulfills a specific need in the industry.

Example 2

Forty-five and four-tenths parts (0.2 mole) of 4-[bis(2-cyanoethyl)amino]-benzaldehyde and 35 parts (0.2 mole) 2-methylene-1,3,3-trimethylindoline (Fischer's base) are added to a solution of 240 parts isopropyl alcohol and 24 parts water. The mixture of reactants and solvents is heated to 80° C. and 34 parts of a 75 percent phosphoric acid solution are added dropwise over a one-half hour period to catalyze the condensation reaction. A deep red solution forms rapidly as the acid is added. The reaction mixture is heated for an additional hour at 80 to 85° C. and then cooled in an ice water bath. The dye partially crystallizes from the isopropyl alcohol solution even at the reaction temperature. The crystals of dye are separated by filtration, washed with isopropyl alcohol, and then dried to obtain a near quantitative yield of dye. The dye dissolves readily in water and gives a maximum absorbance in water containing 10% acetic acid at 495 mu using a General Electric spectrophotometer.

The dye of this example has the same structure and significant utility as the dye of Example 1.

Example 3

One hundred parts of the dry dye of Example 1 is dissolved in a mixture of 50 parts glacial acetic acid, 50 parts formic acid and 200 parts water. This concentrated dye solution is then added to 7000 parts of water and heated to 80 to 85° C. A phosphomolybdic acid solution is prepared in a separate vessel by dissolving 110 parts of sodium molybdate ($Na_2MoO_4$), 12 parts disodium acid phosphate ($Na_2HPO_4 \cdot 7H_2O$) and 100 parts formic acid in 2000 parts water. The light yellow colored phosphomolybdic acid solution is added to the hot dye solution until a spot test on paper indicates the dye is completely precipitated as the phosphomolybdic acid complex as judged by the absence of any dye color bleed into the test paper. The precipitated dye slurry is then heated to 90 to 95° C. for approximately one hour and filtered hot. The filter cake is washed with water to remove excess acid. A fine dispersed paste of this dye complex is prepared as follows: 58 parts of the dispersant (the sodium salt of the condensation product of formaldehyde and 2-naphthalene sulfonic acid) are added to the wet dye complex press cake which consists of 146 parts of dye complex and 427 parts of water. The resulting slurry is subjected to milling action by any of the known conventional techniques such as colloid mill or by stirring the paste in the presence of sand. The fine dispersion of the phosphomolybdic acid complex of the scarlet dye is further protected from settling by the addition of dextrin equivalent to about 10 percent on the weight of the paste. In dyeing and printing applications utilizing this dispersed paste it is found that 7.3 parts of the dispersed paste have the same color values as one part of the pure water soluble scarlet dye.

Example 4

Acetic acid solution—Direct preparation: 22.7 parts 4-[bis(2-cyanoethyl)amino]-benzaldehyde and 17.5 parts 2-methylene-1,3,3-trimethylindoline (Fischer's base) are added to 80 parts glacial acetic acid. The mixture is heated to 80–85° C. and held for 15 minutes; a fluid, deep-red solution of the acetate salt forms rapidly. A comparison of the dye strength of this solution with that of the isolated crytalline product of Example 2 shows that essentially a complete conversion of intermediates to the desired dye acetate salt solution was obtained.

Example 5

Chloride salt: The chloride salt of the subject dye can be readily prepared by, for example, adding five parts of the above acetic acid solutions of the dye with good agitation to 50 parts of a 15% sodium chloride solution containing one part of 37% hydrochloric acid. After stirring approximately one-half hour at room temperature the dye crystals are removed by filtration and dried in a 70° C. oven.

Example 6

Sulfate salt: The procedure above is repeated except that the acetic acid solution is added to a 20% ammonium sulfate solution containing one part of 98% sulfuric acid. The crystalline product is isolated by filtration and dried at 70° C.

The novel dye of the present invention also shows superior lightfastness properties on polyacrylonitrile fibers that have been treated with a flame retardant. Such fibers find particular utility in carpeting, curtains, draperies, upholstering and wearing apparel such as sweaters and dresses. A specific representative acrylic fiber is disclosed in British Patent 1,007,620 and a representative flame retardant which may be introduced as a spinning additive (about 7½ percent) in a haloalkyl phosphate as identified in U.S. Patent 3,149,089. It is clear, of course, that other acrylic fibers and flame retardants, as would be utilized by one skilled in the art, may be combined with the novel dye of this invention to achieve essentially the same superior lightfastness properties.

A very attractive deep navy shade on anionic polyacrylic fibers can be obtained with excellent lightfastness by using a mixture of the subject water soluble form of the present novel scarlet dye and Basic Green 4 C.I. 42,000 in the proportions of about 0.75 percent of the green dye and 0.45 percent of the scarlet dye (percentages based on the weight of the acrylic fibers) when applied in an aqueous dyebath at dyeing temperatures in the range of 93–110° C.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claim.

The embodiments of the invention in which an exclusive property or privilege is claimed are as follows:

1. The dye of the formula:

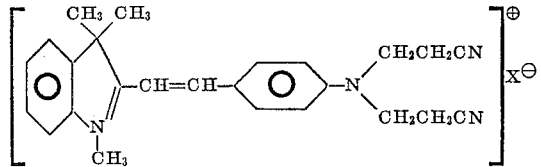

wherein said $X^\ominus$ is an anion selected from the group consisting of $H_2PO_4^\ominus$, phosphomolybdate, acetate, chloride and sulfate.

References Cited

UNITED STATES PATENTS

| | | | |
|---|---|---|---|
| 2,164,793 | 7/1939 | Winter et al. | 260—240.9 |
| 2,668,540 | 9/1954 | Ganguin et al. | 260—240.9 X |
| 2,772,943 | 12/1956 | Hiller | 260—240.9 X |

FOREIGN PATENTS

| | | |
|---|---|---|
| 1,343,222 | 10/1963 | France. |
| 595,571 | 12/1947 | Great Britain. |
| 13,748 | 8/1966 | Japan. |

OTHER REFERENCES

Derwent: Japanese Patents Abstracts, vol. 5, No. 31, Group 2, p. 8 (Sept. 6, 1966).

JOHN D. RANDOLPH, *Primary Examiner.*